United States Patent
Kim et al.

(10) Patent No.: US 12,246,634 B2
(45) Date of Patent: Mar. 11, 2025

(54) AUTOMATIC POP-UP DEVICE FOR VEHICLE LEGREST

(71) Applicants: Hyundai Motor Company, Seoul (KR); Kia Corporation, Seoul (KR)

(72) Inventors: Min Seok Kim, Gyeonggi-do (KR); Sang Do Park, Gyeonggi-do (KR); Tae Jun Kwon, Incheon (KR); Du Go Jung, Gyeonggi-do (KR); Chan Ho Jung, Gyeonggi-do (KR); Hyun Kyu Moon, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 317 days.

(21) Appl. No.: 17/972,949

(22) Filed: Oct. 25, 2022

(65) Prior Publication Data

US 2023/0191974 A1    Jun. 22, 2023

(51) Int. Cl.
  *B60N 2/90*      (2018.01)
  *B60N 2/02*      (2006.01)
(52) U.S. Cl.
  CPC ......... *B60N 2/995* (2018.02); *B60N 2/02246* (2023.08)
(58) Field of Classification Search
  CPC .. B60N 2/995; B60N 2/02253; B60N 2/1695; B60N 2/02246; B60N 2/10; B60N 2/1842; B60N 3/063
  See application file for complete search history.

(56) References Cited

U.S. PATENT DOCUMENTS

| | | | |
|---|---|---|---|
| 10,512,332 B2* | 12/2019 | LaPointe | A47C 1/0352 |
| 2019/0168644 A1* | 6/2019 | Kim | B60N 2/995 |
| 2022/0048422 A1* | 2/2022 | Kim | B60N 2/995 |
| 2023/0044679 A1* | 2/2023 | Jung | B60N 2/12 |
| 2023/0158925 A1* | 5/2023 | Zuo | B60N 2/34 |
| | | | 297/344.1 |
| 2023/0202357 A1* | 6/2023 | Tang | B60N 2/165 |
| | | | 297/316 |
| 2023/0398917 A1* | 12/2023 | Enns | B60N 2/02253 |

FOREIGN PATENT DOCUMENTS

| | | |
|---|---|---|
| JP | 5414263 B2 | 2/2014 |
| JP | 5490873 B2 | 5/2014 |
| JP | 6803599 B2 | 12/2020 |
| KR | 2019-0066673 A | 6/2019 |

* cited by examiner

*Primary Examiner* — Mark R Wendell
(74) *Attorney, Agent, or Firm* — Fox Rothschild LLP

(57) ABSTRACT

Provided is an automatic pop-up device for a vehicle legrest having the following effects. A seatback reclining mechanism, a tilting mechanism, and a legrest deployment mechanism are formed as a simple integrated mechanism configured to adjust a relaxation position of a passenger, and the integrated mechanism allows the legrest to be automatically deployed when a reclining operation of a seatback and a tilting operation of a seat cushion are performed together, thereby reducing the number of components, costs, and weight. Additionally, provided is a single switch configured to adjust the relaxation position of the passenger, thereby improving the convenience of a switch operation of adjusting the relaxation position of the passenger.

20 Claims, 7 Drawing Sheets

AUTOMATIC POP-UP DEVICE FOR VEHICLE LEGREST

CROSS-REFERENCE TO RELATED APPLICATION

This application claims under 35 U.S.C. § 119(a) the benefit of Korean Patent Application No. 10-2021-0182338 filed on Dec. 20, 2021, the entire contents of which are incorporated herein by reference.

TECHNICAL FIELD

Embodiments of the present disclosure relate to an automatic pop-up device for a vehicle legrest. More particularly, it relates to an automatic pop-up device for a vehicle legrest that enables the legrest to automatically pop up when a relaxation posture of a seat is changed according to a reclining operation of a seatback and a tilting operation of a seat cushion.

BACKGROUND ART

Generally, a seat for a vehicle is manufactured in a structure that fundamentally includes a seat cushion for seating, a seatback against which a back of a passenger rests, and a headrest that supports the neck and head of the passenger. Additionally, a seat position adjustment mechanism, configured to change a seat position depending on a body shape of a passenger and on the circumstances, is applied to the seat.

For example, the seat position adjustment mechanism may include a seat height adjustment mechanism, a tilting mechanism configured to adjust an angle of inclination of the seat cushion, a seatback reclining mechanism configured to adjust an angle of the seatback, and a legrest deployment mechanism configured to support the passenger's legs. Here, a relaxation position of the seat may be implemented by a tilting operation of the seat cushion and a reclining operation of the seatback.

The relaxation position of the seat refers to a seat position in which a passenger may take a comfortable resting posture while distributing the body pressure of the passenger as much as possible.

In the related art, the relaxation position of the seat is adjusted by simultaneously performing an operation of reclining the seatback rearwards using the seatback reclining mechanism, a tilting operation of raising the front end of the seat cushion by the tilting mechanism, and an operation of deploying the legrest mounted in the front end of the seat cushion using the legrest deployment mechanism.

In the case in which the relaxation position of the seat is being adjusted, if only the operation of reclining the seatback rearwards and the tilting operation of raising the front end of the seat cushion are performed, the passenger may feel pressure on the thighs.

Accordingly, when the relaxation position of the seat is adjusted, it is required to deploy the legrest at a predetermined angle to relieve the pressure on the passenger's thighs.

However, in order to adjust the relaxation position of the seat, the seatback reclining mechanism, the tilting mechanism, and the legrest deployment mechanism are individually provided, which results in various problems, such as complexity of the seat mechanisms, an increase in the number of components (for example, each mechanism requires a motor and a plurality of links), and an increase in costs and weight.

In addition, since a switch for tilting and reclining, a legrest operation switch, and a relaxation-and-legrest-interlocking switch are all required in order to adjust the relaxation position of the seat, there is a problem in that a switch operation of adjusting the relaxation position of the passenger is inconvenient and confusing.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and it is an object of the present disclosure to provide an automatic pop-up device for a vehicle legrest having the following effects. A seatback reclining mechanism, a tilting mechanism, and a legrest deployment mechanism are formed as a simple integrated mechanism configured to adjust a relaxation position of a passenger, and the integrated mechanism allows the legrest to be automatically deployed when a reclining operation of a seatback and a tilting operation of a seat cushion are performed together, thereby reducing the number of components, costs, and weight. Additionally, provided is a single switch configured to adjust the relaxation position of the passenger, thereby improving the convenience of a switch operation of adjusting the relaxation position of the passenger.

In one embodiment, the present disclosure provides an automatic pop-up device for a vehicle legrest, the automatic pop-up device including a support frame including a pair of front brackets and a pair of rear brackets formed therein, the support frame being mounted in a seat rail, a driving shaft rotatably connected to the rear bracket of the support frame, a rear link having an upper end thereof hingedly coupled to a seat cushion frame and a lower end thereof rotatably coupled to the driving shaft, a motor including a gearbox coupled to the driving shaft, the motor transmitting rotational power to the driving shaft through the gearbox, a front link having an upper end thereof hingedly coupled to the seat cushion frame and a lower end thereof rotatably connected to the front bracket, a legrest frame positioned in front of the seat cushion frame so as to be deployable, and a pop-up driving device coupled to the support frame so as to be movable forwards and rearwards, configured to connect a connection shaft, the connection shaft connecting the upper ends of the rear links, to the legrest frame, and to push and deploy the legrest frame when a reclining operation of a seatback frame and a tilting operation of the seat cushion frame are performed together.

In a preferred embodiment, the pop-up driving device may include a slider coupled to the support frame so as to be movable forwards and rearwards, a first push-pull bar having a rear end thereof hingedly coupled to the connection shaft and a front end thereof hingedly coupled to a rear end of the slider, and a second push-pull bar having a rear end thereof hingedly coupled to a front end of the slider and a front end thereof hingedly coupled to the legrest frame.

In another preferred embodiment, the support frame may include a sliding rail formed therein, the sliding rail being coupled to a lower end of the slider to allow the lower end of the slider to be movable forwards and rearwards.

In still another preferred embodiment, the legrest frame may have an upper end thereof hingedly coupled to a front end of the seat cushion frame, and may include a first hinge end, formed on a rear surface thereof and hingedly coupled to the front end of the second push-pull bar.

In yet another preferred embodiment, the legrest frame may be hingedly coupled to a lower end of an extending support frame to be used as a footrest, the extending support frame extending downwards from a front end of the seat cushion frame, and the legrest frame for the footrest may include a second hinge end, formed on a rear surface thereof and hingedly coupled to the second push-pull bar.

In still yet another preferred embodiment, the pop-up driving device may include a first slider coupled to the support frame so as to be movable forwards and rearwards, a second slider coupled to the support frame so as to be movable forwards and rearwards at a position spaced apart from the first slider by a predetermined distance in a forward direction, the second slider being connected to the legrest frame, a first push-pull bar having a rear end thereof hingedly coupled to the connection shaft and a front end thereof hingedly coupled to a rear end of the first slider, and a second push-pull bar having a rear end thereof hingedly coupled to a front end of the first slider and a front end thereof hingedly coupled to a rear end of the second slider.

In a further preferred embodiment, the support frame may include a sliding rail formed therein, the sliding rail being coupled to lower ends of the first slider and the second slider to allow the lower ends thereof to be movable forwards and rearwards.

In another further preferred embodiment, the legrest frame may include an upper plate configured to support the legs of a passenger, a first elevation link having an upper end thereof hingedly coupled to a rear end of the upper plate and a lower end thereof fixed to a floor panel, and a second elevation link having an upper end thereof hingedly coupled to a front end of the upper plate and a lower end thereof hingedly coupled to a front end of the second slider, the second elevation link and the first elevation link being disposed to cross each other.

In some embodiments, the first elevation link and the second elevation link are arranged to cross each other in an X-shape.

In still another further preferred embodiment, the lower end of the front link may be connected to a driven shaft, the driven shaft rotatably connecting the front brackets, and the support frame may be mounted on a moving rail, the moving rail being coupled to a fixed rail of the seat rail so as to be movable forwards and rearwards.

In some embodiments, the legrest frame is configured to be deployed in the upper direction when the legrest frame is formed as a separate object at a position spaced apart from the front end of the seat cushion frame.

In some embodiments, each of the rear brackets is formed in a vertically upright orientation at a corresponding one of the opposite rear ends of the support frame, and each of the front brackets is formed in a vertically upright orientation at a corresponding one of the opposite front ends of the support frame.

In some embodiments, the motor is mounted at a predetermined position of a seat cushion frame or the support frame.

In some embodiments, the front bracket of the support frame and each of the front links, hingedly coupled to a corresponding one of the opposite front ends of the seat cushion frame, rotate forwards to support the front end of the seat cushion frame.

In some embodiments, the seatback frame is integrally connected to the seat cushion frame such that the reclining operation, in which the seatback frame is inclined rearwards, is performed together during the tilting operation of the seat cushion frame.

In some embodiments, the automatic pop-up device further comprises a single switch to apply current to the motor.

As discussed, the method and system suitably include use of a controller or processer.

In another embodiment, vehicles are provided that comprise an apparatus as disclosed herein.

Other embodiments and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
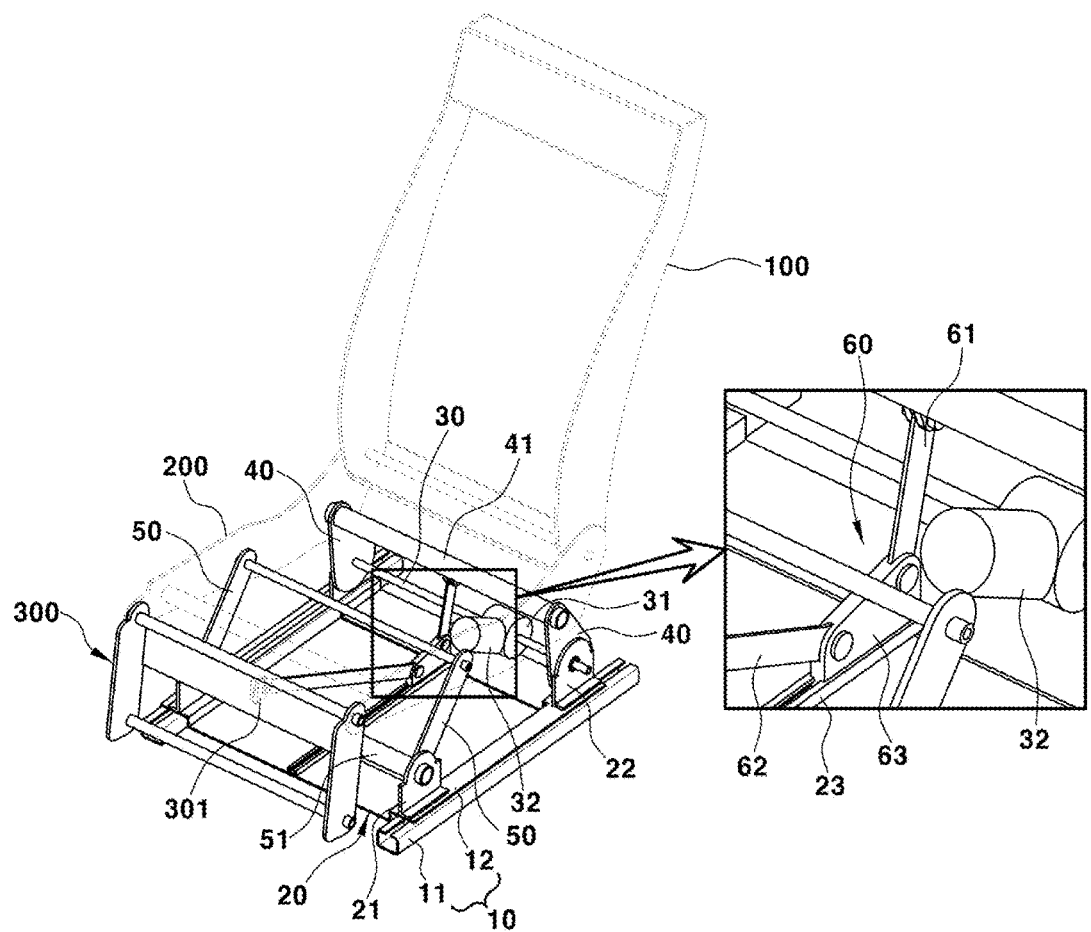
FIG. 1 is a perspective view showing an automatic pop-up device for a vehicle legrest according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g.

fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present disclosure will be described in detail with reference to the accompanying drawings.

Figure 2:
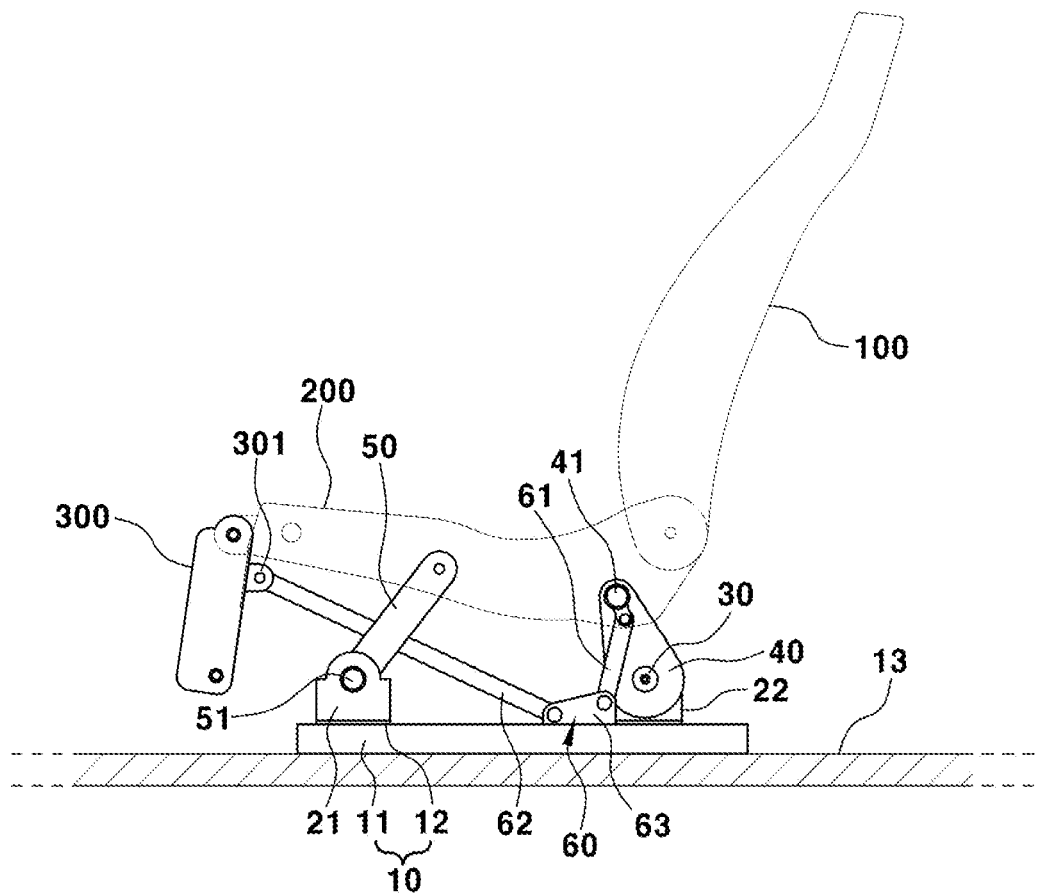
FIG. 2 is a side view showing the automatic pop-up device for the vehicle legrest according to the embodiment of the present disclosure.

FIGS. 1 and 2 are views showing an automatic pop-up device for a vehicle legrest according to an embodiment of the present disclosure. Here, reference numeral 10 in each drawing indicates a seat rail.

The seat rail 10 is formed of a fixed rail 11, mounted in an interior floor panel 13 of the vehicle, and a moving rail 12, coupled to the fixed rail 11 so as to be slidable forwards and rearwards.

In the configuration of the seat rail 10, a support frame 20 is mounted in the moving rail 12, the support frame 20 including a pair of front brackets 21 and a pair of rear brackets 22. Accordingly, when the moving rail 12 moves forwards and rearwards, the support frame 20 may move therewith.

In this case, each of the rear brackets 22 is formed in a vertically upright orientation at a corresponding one of the opposite rear ends of the support frame 20, and each of the front brackets 21 is formed in a vertically upright orientation at a corresponding one of the opposite front ends thereof.

A driving shaft 30 rotatably connects the rear brackets 22 of the support frame 20 using bearings, and a gearbox 31 of a motor 32 configured to transmit rotational power is coupled to the driving shaft 30.

More specifically, the motor 32 including the gearbox 31 may be mounted at a predetermined position of a seat cushion frame 200 or the support frame 20, and rotational driving force of the motor 32 is transmitted to the driving shaft 30 through the gearbox 31 having a predetermined gear train built therein, thereby rotating the driving shaft 30.

A pair of rear links 40 are coupled to the driving shaft 30 to be rotated together with the driving shaft 30.

To this end, each of the upper ends of the pair of rear links 40 is hingedly coupled to a corresponding one of the opposite rear ends of the seat cushion frame 200, and each of the lower ends of the pair of rear links 40 is rotatably coupled to a corresponding one of the opposite ends of the driving shaft 30.

It is desirable for the driving shaft 30 and the lower end of the rear link 40 to be spline-coupled to each other so as to transmit rotational power. Accordingly, when the driving shaft 30 rotates, the upper end of the rear link 40 may be rotated in the forward-and-rearward direction around the lower end of the rear link 40.

A front link 50 connects the front bracket 21 of the support frame 20 to the seat cushion frame 200.

That is, each of the upper ends of the front links 50 may be hingedly coupled to a corresponding one of the opposite front ends of the seat cushion frame 200, and each of the lower ends of the front links 50 may be rotatably and hingedly coupled to a corresponding one of the front brackets 21.

Alternatively, the lower end of the front link 50 may be rotatably connected to a driven shaft 51, the driven shaft 51 rotatably connecting the front brackets 21.

In this manner, the seat cushion frame 200 is supported to be tiltable and rotatable by a four-bar linkage mechanism including a pair of rear links 40 and a pair of front links 50.

According to the embodiment of the present disclosure, the upper end of a legrest frame 300 is hingedly coupled to the front end of the seat cushion frame 200 so that the legrest frame 300 is positioned in front of the seat cushion frame 200 so as to be deployable.

Particularly, a pop-up driving device 60, configured to deploy the legrest frame 300, is mounted over the support frame 20, the rear link 40, and the legrest frame 300.

In more detail, the pop-up driving device 60 is coupled to the support frame 20 so as to be movable forwards and rearwards, the pop-up driving device 60 connecting a connection shaft 41, the connection shaft 41 connecting the upper ends of the rear links 40, to the legrest frame 300. Accordingly, when the reclining operation of a seatback frame 100 and the tilting operation of the seat cushion frame 200 are performed together, the pop-up driving device 60 performs a function of pushing and deploying the legrest frame 300.

To this end, the pop-up driving device 60 according to the embodiment of the present disclosure may be formed of a slider 63 coupled to the support frame 20 so as to be movable forwards and rearwards, a first push-pull bar 61 having the rear end thereof hingedly coupled to the connection shaft 41 and the front end thereof hingedly coupled to the rear end of the slider 63, and a second push-pull bar 62 having the rear end thereof hingedly coupled to the front end of the slider 63 and the front end thereof hingedly coupled to the legrest frame 300.

Here, the support frame 20 includes a sliding rail 23, formed therein and coupled to the lower end of the slider 63 to allow the same to be movable forwards and rearwards.

Additionally, the legrest frame 300 includes a first hinge end 301, formed on the rear surface thereof and hingedly coupled to the front end of the second push-pull bar 62.

Here, the operation flow of the automatic pop-up device for the vehicle legrest according to the embodiment of the present disclosure will be described below.

Figure 3:
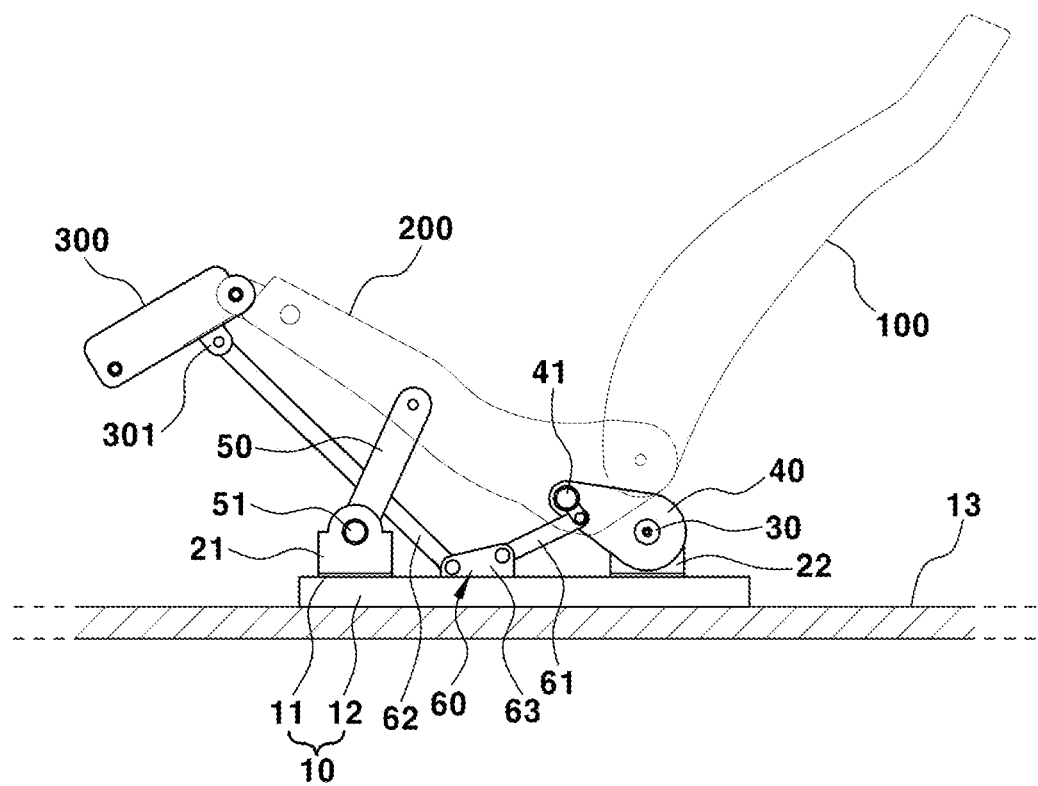
FIG. 3 is a side view showing the operation state of the automatic pop-up device for the vehicle legrest according to the embodiment of the present disclosure.

FIG. 3 is a side view showing the operation state of the automatic pop-up device for the vehicle legrest according to the embodiment of the present disclosure.

First, when a passenger operates a single switch for relaxation position adjustment ON, current is applied to the motor 32 to output rotational driving force of the motor 32 through the gearbox 31.

Accordingly, the rotational driving force of the motor 32 is transmitted to the driving shaft 30 through the gearbox 31 having a predetermined gear train built therein, thereby performing forward rotation of the driving shaft 30.

Next, when the driving shaft 30 rotates forwards, the upper end of the rear link 40 also rotates forwards around the lower end of the rear link 40.

In this case, a hinge coupling point between each of the upper ends of the rear links 40 and a corresponding one of the opposite rear ends of the seat cushion frame 200 and an axial center of the connection shaft 41 connecting the rear links 40 move forwards and simultaneously move downwards.

Accordingly, when the hinge coupling point between each of the upper ends of the rear links 40 and the corresponding one of the opposite rear ends of the seat cushion frame 200 moves forwards and simultaneously moves downwards, the rear end of the seat cushion frame 200 may also move forwards and may simultaneously move downwards.

In this case, when the rear end of the seat cushion frame 200 moves downwards, the front end of the seat cushion frame 200 moves upwards. Here, the front bracket 21 of the support frame 20 and each of the front links 50, hingedly coupled to a corresponding one of the opposite front ends of the seat cushion frame 200, rotate forwards to support the front end of the seat cushion frame 200.

In this manner, it is possible to perform the tilting operation in which the rear end of the seat cushion frame 200 moves downwards and the front end of the seat cushion frame 200 moves upwards by the forward rotation of the four-bar linkage mechanism including the pair of rear links 40 and the pair of front links 50.

Here, since the seatback frame 100 is integrally connected to the seat cushion frame 200, the reclining operation, in which the seatback frame 100 is inclined rearwards, is performed together during the tilting operation of the seat cushion frame 200.

In addition, when the axial center of the connection shaft 41, connecting the rear links 40, moves forwards and simultaneously moves downwards, the first push-pull bar 61 of the pop-up driving device 60, which is hingedly coupled to the connection shaft 41, pushes the slider 63 forwards. Accordingly, the slider 63 moves forwards along the sliding rail 23 by a predetermined distance.

Next, when the slider 63 moves forwards, the slider 63 pushes the second push-pull bar 62 forwards.

Accordingly, since the front end of the second push-pull bar 62 is hingedly coupled to the first hinge end 301 formed on the rear surface of the legrest frame 300, the second push-pull bar 62 pushes the legrest frame 300 in the deployment direction, and as such, the legrest frame 300 is in a state of being deployed to a position at which the passenger may place the feet on the legrest frame 300.

As described above, when the reclining operation of the seatback frame 100 and the tilting operation of the seat cushion frame 200 are performed together, it is possible to provide a relaxation position adjustment mechanism configured to allow the legrest frame 300 to automatically pop up to deploy the same, thereby allowing a passenger to instantly take a relaxing and comfortable posture that may relieve the pressure on the thighs of the passenger. In this manner, it is possible to improve the comfort of the passenger.

In addition, when the reclining operation of the seatback frame 100 and the tilting operation of the seat cushion frame 200 are performed together, the legrest frame 300 automatically pops up and is deployed, thereby having an effect of simultaneously providing a seatback reclining mechanism, a tilting mechanism, and a legrest deployment mechanism as an integrated mechanism and thus reducing the number of components, costs, and weight.

Figure 4:
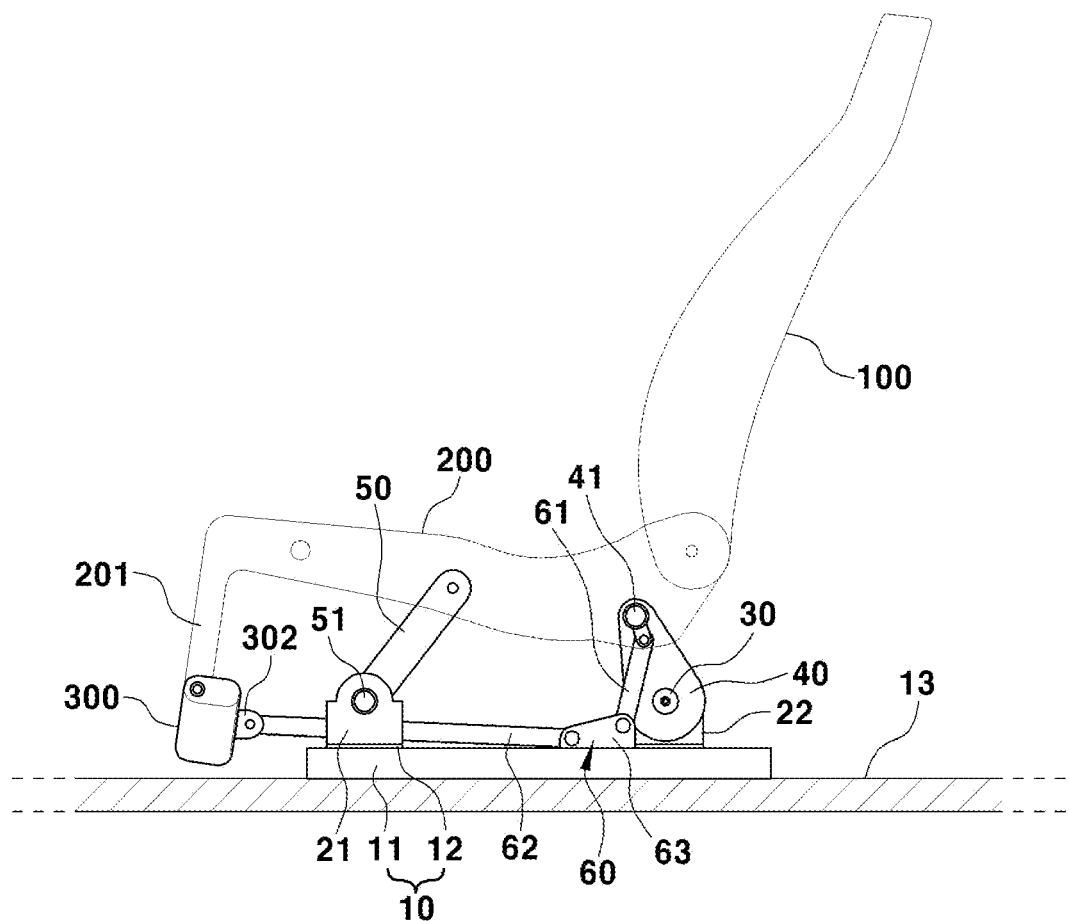
FIG. 4 is a side view showing an automatic pop-up device for a vehicle legrest according to another embodiment of the present disclosure.
Figure 5:
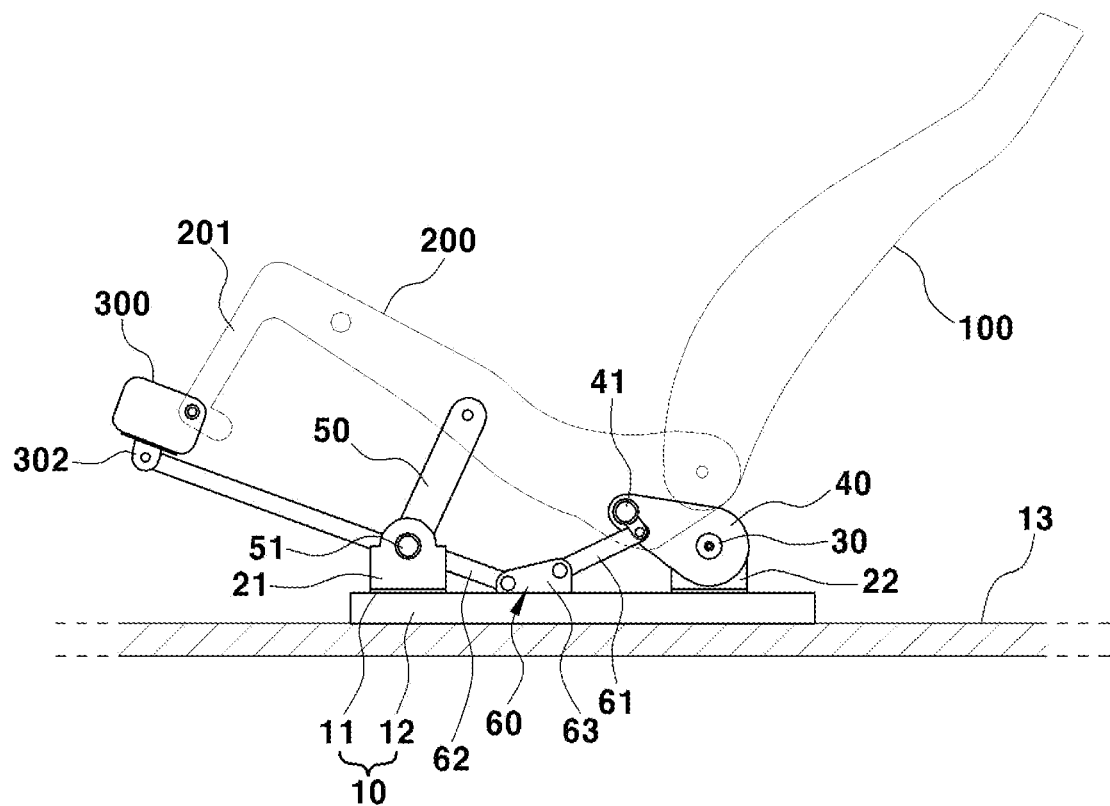
FIG. 5 is a side view showing the operation state of the automatic pop-up device for the vehicle legrest according to another embodiment of the present disclosure.

FIG. 4 is a side view showing an automatic pop-up device for a vehicle legrest according to another embodiment of the present disclosure, and FIG. 5 is a side view showing the operation state of the automatic pop-up device for the vehicle legrest according to another embodiment of the present disclosure.

According to another embodiment of the present disclosure, the legrest frame 300 may be used for a footrest depending on the design and manufacturing form of the seat cushion frame 200.

As shown in FIGS. 4 and 5, when the seat cushion frame 200 is manufactured in a structure having an extending support frame 201 extending downwards from the front end of the seat cushion frame 200, the legrest frame 300 is hingedly coupled to the lower end of the extending support frame 201 to be used as a footrest. Further, the legrest frame 300 for the footrest has a second hinge end 302 formed on the rear surface thereof and hingedly coupled to the second push-pull bar 62.

Therefore, as described in the embodiment of the present disclosure, when the reclining operation of the seatback frame 100 and the tilting operation of the seat cushion frame 200 are performed together, the second push-pull bar 62 pushes the legrest frame 300 for the footrest in the deployment direction, and as such, the legrest frame 300 is in a state of being deployed to a position at which the passenger may place the feet on the legrest frame 300.

As described above, when the reclining operation of the seatback frame 100 and the tilting operation of the seat cushion frame 200 are performed together, it is possible to provide a relaxation position adjustment mechanism configured to allow the legrest frame 300 for the footrest to automatically pop up to be deployed, thereby allowing a passenger to instantly take a relaxing and comfortable posture that may relieve the pressure on the thighs of the passenger while placing the feet on the legrest frame 300. In this manner, it is possible to improve the comfort of the passenger.

Figure 6:
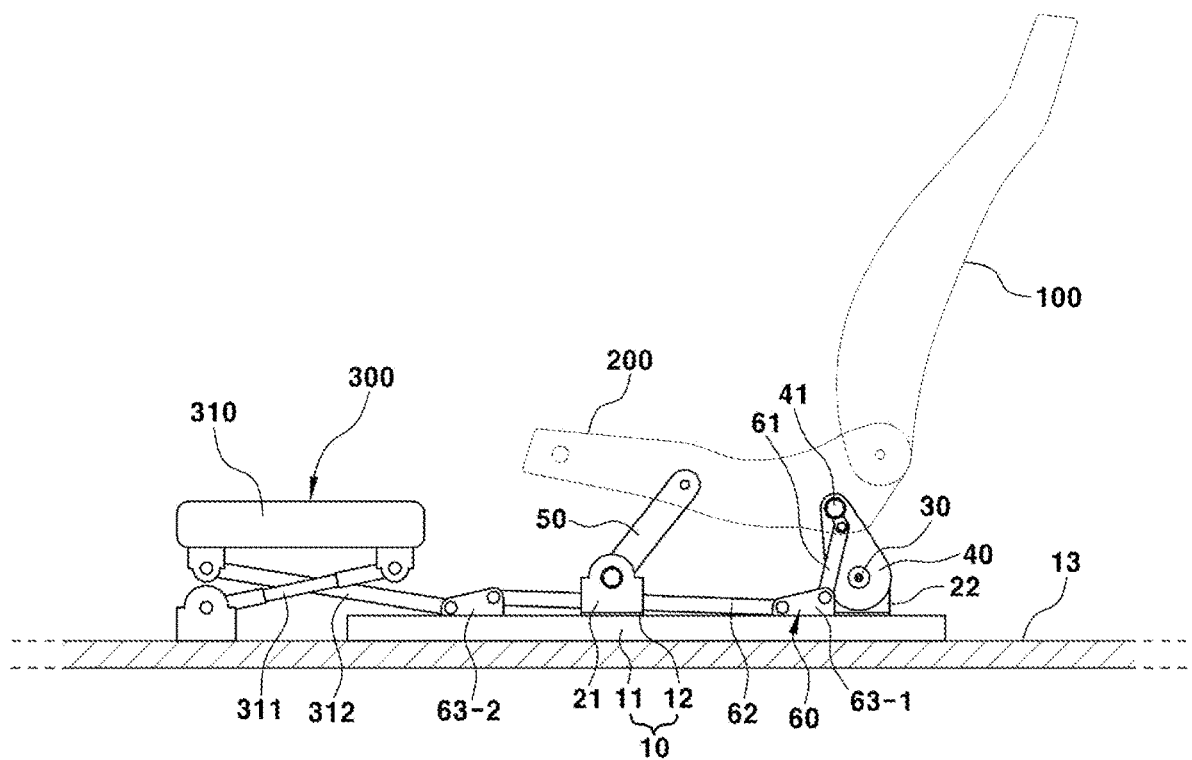
FIG. 6 is a side view showing an automatic pop-up device for a vehicle legrest according to still another embodiment of the present disclosure.
Figure 7:
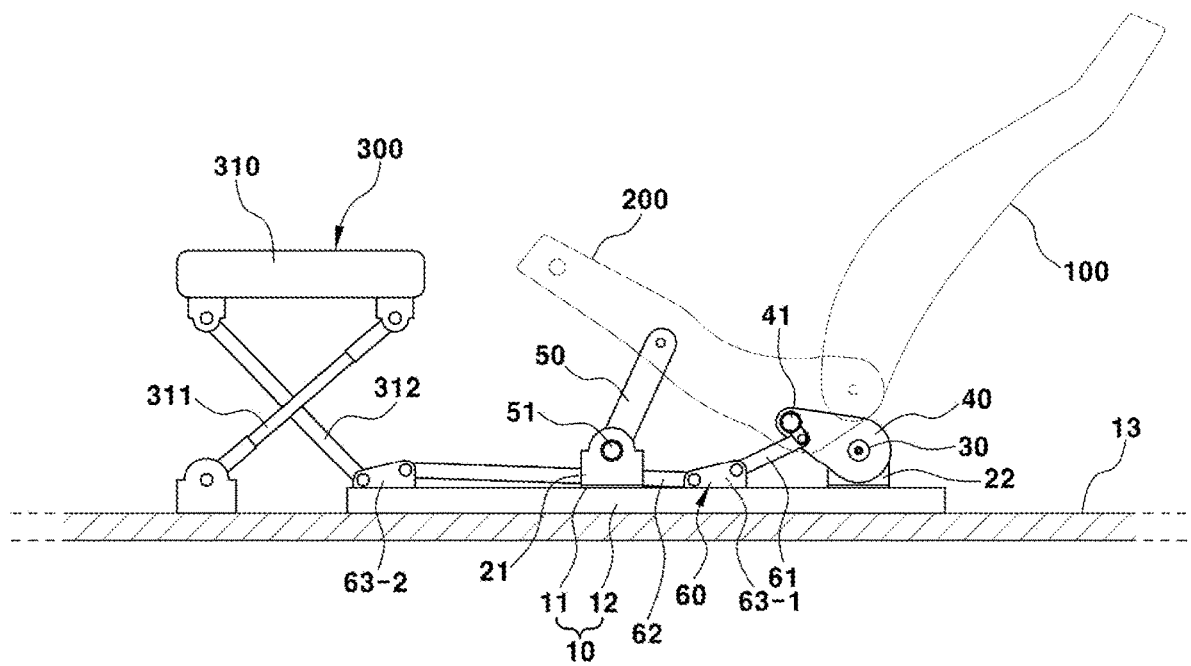
FIG. 7 is a side view showing the operation state of the automatic pop-up device for the vehicle legrest according to still another embodiment of the present disclosure.

FIG. 6 is a side view showing an automatic pop-up device for a vehicle legrest according to still another embodiment of the present disclosure, and FIG. 7 is a side view showing the operation state of the automatic pop-up device for the vehicle legrest according to still another embodiment of the present disclosure.

Still another embodiment of the present disclosure is characterized in that the legrest frame 300 may be deployed in the upward direction when the legrest frame 300 is formed as a separate object at a position spaced apart from the front end of the seat cushion frame 200.

To this end, the pop-up driving device 60 according to still another embodiment of the present disclosure may be formed of a first slider 63-1 coupled to the support frame 20 so as to be movable forwards and rearwards, a second slider 63-2 coupled to the support frame 20 so as to be movable forwards and rearwards at a position spaced apart from the first slider 63-1 by a predetermined distance in the forward direction, the second slider 63-2 being connected to the separate-type legrest frame 300, the first push-pull bar 61 having the rear end thereof hingedly coupled to the connection shaft 41 connecting the upper ends of the rear links 40, and the front end thereof hingedly coupled to the rear end of the first slider 63-1, and the second push-pull bar 62 having the rear end thereof hingedly coupled to the front end of the first slider 63-1 and the front end thereof hingedly coupled to the rear end of the second slider 63-2.

In this case, the lower ends of the first slider 63-1 and the second slider 63-2 are coupled to the sliding rail 23 formed on the support frame 20 so as to be movable forwards and rearwards.

Meanwhile, the separate-type legrest frame 300 may be formed of an upper plate 310 configured to support the legs of a passenger, a first elevation link 311 having the upper end thereof hingedly coupled to the rear end of the upper plate 310 and the lower end thereof fixed to the floor panel 13, and a second elevation link 312 having the upper end thereof hingedly coupled to the front end of the upper plate 310 and the lower end thereof hingedly coupled to the front end of the second slider 63-2.

In this case, the first elevation link 311 and the second elevation link 312 are arranged to cross each other in an X-shape.

Here, an operation flow of the automatic pop-up device for the vehicle legrest according to still another embodiment of the present disclosure will be described as follows.

First, when a passenger operates a single switch for relaxation position adjustment ON, current is applied to the motor 32 to output rotational driving force of the motor 32 through the gearbox 31.

Accordingly, the rotational driving force of the motor 32 is transmitted to the driving shaft 30 through the gearbox 31 having a predetermined gear train built therein, thereby performing forward rotation of the driving shaft 30.

Next, when the driving shaft 30 rotates forwards, the upper end of the rear link 40 also rotates forwards around the lower end of the rear link 40.

In this case, a hinge coupling point between each of the upper ends of the rear links 40 and a corresponding one of the opposite rear ends of the seat cushion frame 200 and an axial center of the connection shaft 41 connecting the rear links 40 move forwards and simultaneously move downwards.

Accordingly, when the hinge coupling point between each of the upper ends of the rear links 40 and the corresponding one of the opposite rear ends of the seat cushion frame 200 moves forwards and simultaneously moves downwards, the rear end of the seat cushion frame 200 may also move forwards, and may simultaneously move downwards.

In this case, when the rear end of the seat cushion frame 200 moves downwards, the front end of the seat cushion frame 200 moves upwards. Here, the front bracket 21 of the support frame 20 and each of the front links 50, hingedly coupled to a corresponding one of the opposite front ends of the seat cushion frame 200, rotate forwards to support the front end of the seat cushion frame 200.

Here, since the seatback frame 100 is integrally connected to the seat cushion frame 200, the reclining operation, in which the seatback frame 100 is inclined rearwards, is performed together during the tilting operation of the seat cushion frame 200.

In addition, when the axial center of the connection shaft 41 connecting the rear links 40 moves forwards and simultaneously moves downwards, the first push-pull bar 61 of the pop-up driving device 60, which is hingedly coupled to the connection shaft 41, pushes the first slider 63-1 forwards. Accordingly, the first slider 63-1 moves forwards along the sliding rail 23 by a predetermined distance.

Next, when the slider 63-1 moves forwards, the first slider 63-1 pushes the second push-pull bar 62 forwards, and the second push-pull bar 62 pushes the second slider 63-2 forwards.

Next, the second slider 63-2 moves forwards to push the second elevation link 312 in the configuration of the separate-type legrest frame 300. Accordingly, while the second elevation link 312 moves upwards, the upper plate 310 is pushed upwards.

In this case, the lower end of the first elevation link 311 is fixed to the floor panel 13. Accordingly, when the upper plate 310 moves upwards, the upper end of the first elevation link 311 also moves upwards to support the upper plate 310.

As described above, when the reclining operation of the seatback frame 100 and the tilting operation of the seat cushion frame 200 are performed together, the upper plate 310 of the legrest frame 300 automatically rises, so the passenger may comfortably place the legs on the upper plate 310.

In this manner, when the reclining operation of the seatback frame 100 and the tilting operation of the seat cushion frame 200 are performed together, it is possible to provide a relaxation position adjustment mechanism configured to allow the upper plate 310 of the legrest frame 300 to automatically pop up and rise, thereby allowing a passenger to immediately take a relaxing and comfortable posture that may relieve the pressure on the thighs of the passenger. Accordingly, it is possible to improve the comfort of the passenger.

As is apparent from the above description, the present disclosure provides the following effects.

First, when a reclining operation of a seatback and a tilting operation of a seat cushion are performed together, it is possible to provide a relaxation position adjustment mechanism configured to allow a legrest to automatically pop up to be deployed, thereby having an effect of simultaneously providing a seatback reclining mechanism, a tilting mechanism, and a legrest deployment mechanism as an integrated mechanism and thus reducing the number of components, costs, and weight.

Second, compared to the related art, in which it is required to respectively operate a tilting-and-reclining switch, a legrest operation switch, and a relaxation-and-legrest interlocking switch to adjust a relaxation position of a seat, the present disclosure provides a single switch configured to adjust the relaxation position of the seat, thereby making it possible to improve the comfort and intuition of a switch operation of adjusting a relaxation position of a passenger.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and equivalents thereto.

What is claimed is:

1. An automatic pop-up device for a vehicle legrest, the automatic pop-up device comprising:
   a support frame comprising a pair of front brackets and a pair of rear brackets formed therein, the support frame being mounted in a seat rail;
   a driving shaft rotatably connected to the rear bracket of the support frame;
   a rear link having an upper end thereof hingedly coupled to a seat cushion frame and a lower end thereof rotatably coupled to the driving shaft;
   a motor comprising a gearbox coupled to the driving shaft, the motor transmitting rotational power to the driving shaft through the gearbox;
   a front link having an upper end thereof hingedly coupled to the seat cushion frame and a lower end thereof rotatably connected to the front bracket;
   a legrest frame positioned in front of the seat cushion frame so as to be deployable; and
   a pop-up driving device coupled to the support frame so as to be movable forwards and rearwards, configured to connect a connection shaft, the connection shaft connecting the upper ends of the rear links, to the legrest frame, and to push and deploy the legrest frame when a reclining operation of a seatback frame and a tilting operation of the seat cushion frame are performed together.

2. The automatic pop-up device of claim 1, wherein the pop-up driving device comprises:
   a slider coupled to the support frame so as to be movable forwards and rearwards,
   a first push-pull bar having a rear end thereof hingedly coupled to the connection shaft and a front end thereof hingedly coupled to a rear end of the slider, and
   a second push-pull bar having a rear end thereof hingedly coupled to a front end of the slider and a front end thereof hingedly coupled to the legrest frame.

3. The automatic pop-up device of claim 2, wherein the support frame comprises a sliding rail formed therein, the sliding rail being coupled to a lower end of the slider to allow the lower end of the slider to be movable forwards and rearwards.

4. The automatic pop-up device of claim 2, wherein the legrest frame comprises an upper end thereof hingedly coupled to a front end of the seat cushion frame.

5. The automatic pop-up device of claim 4, wherein the legrest frame comprises a first hinge end, formed on a rear surface thereof and hingedly coupled to the front end of the second push-pull bar.

6. The automatic pop-up device of claim 2, wherein the legrest frame is hingedly coupled to a lower end of an extending support frame to be used as a footrest, the extending support frame extending downwards from a front end of the seat cushion frame.

7. The automatic pop-up device of claim 6, wherein the legrest frame for the footrest comprises a second hinge end, formed on a rear surface thereof and hingedly coupled to the second push-pull bar.

8. The automatic pop-up device of claim 1, wherein the pop-up driving device comprises:
   a first slider coupled to the support frame so as to be movable forwards and rearwards,
   a second slider coupled to the support frame so as to be movable forwards and rearwards at a position spaced apart from the first slider by a predetermined distance in a forward direction, the second slider being connected to the legrest frame,
   a first push-pull bar having a rear end thereof hingedly coupled to the connection shaft and a front end thereof hingedly coupled to a rear end of the first slider, and
   a second push-pull bar having a rear end thereof hingedly coupled to a front end of the first slider and a front end thereof hingedly coupled to a rear end of the second slider.

9. The automatic pop-up device of claim 8, wherein the support frame comprises a sliding rail formed therein, the sliding rail being coupled to lower ends of the first slider and the second slider to allow the lower ends thereof to be movable forwards and rearwards.

10. The automatic pop-up device of claim 8, wherein the legrest frame comprises:
    an upper plate configured to support the legs of a passenger,
    a first elevation link having an upper end thereof hingedly coupled to a rear end of the upper plate and a lower end thereof fixed to a floor panel, and
    a second elevation link having an upper end thereof hingedly coupled to a front end of the upper plate and a lower end thereof hingedly coupled to a front end of the second slider, the second elevation link and the first elevation link being disposed to cross each other.

11. The automatic pop-up device of claim 10, wherein the first elevation link and the second elevation link are arranged to cross each other in an X-shape.

12. The automatic pop-up device of claim 1, wherein the lower end of the front link is alternatively connected to a driven shaft, the driven shaft rotatably connecting the front brackets.

13. The automatic pop-up device of claim 1, wherein the support frame is mounted on a moving rail, the moving rail being coupled to a fixed rail of the seat rail so as to be movable forwards and rearwards.

14. The automatic pop-up device of claim 1, wherein the legrest frame is configured to be deployed in the upper direction when the legrest frame is formed as a separate object at a position spaced apart from the front end of the seat cushion frame.

15. The automatic pop-up device of claim 1, each of the rear brackets is formed in a vertically upright orientation at a corresponding one of the opposite rear ends of the support frame, and each of the front brackets is formed in a vertically upright orientation at a corresponding one of the opposite front ends of the support frame.

16. The automatic pop-up device of claim 1, wherein the motor is mounted at a predetermined position of a seat cushion frame or the support frame.

17. The automatic pop-up device of claim 1, wherein the front bracket of the support frame and each of the front links, hingedly coupled to a corresponding one of the opposite front ends of the seat cushion frame, rotate forwards to support the front end of the seat cushion frame.

18. The automatic pop-up device of claim 1, the seatback frame is integrally connected to the seat cushion frame such that the reclining operation, in which the seatback frame is inclined rearwards, is performed together during the tilting operation of the seat cushion frame.

19. The automatic pop-up device of claim 1 further comprising a single switch to apply current to the motor.

20. A vehicle comprising the automatic pop-up device of claim 1.

* * * * *